Figure 1:
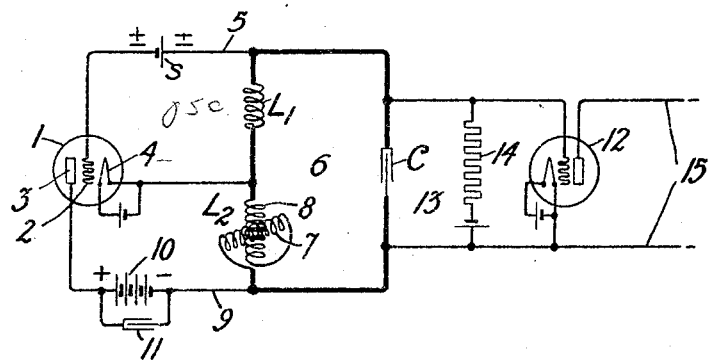

Nov. 16, 1926.

F. W. ISLES 1,606,792

OSCILLATION GENERATOR FOR CURRENT OF CONTINUOUSLY VARYING FREQUENCY

Filed Oct. 6, 1919

Inventor:
Frederick W. Isles.
by C. G. Sprague, Att'y.

Patented Nov. 16, 1926.

1,606,792

UNITED STATES PATENT OFFICE.

FREDERICK W. ISLES, OF BROOKLYN, NEW YORK, ASSIGNOR TO WESTERN ELECTRIC COMPANY, INCORPORATED, OF NEW YORK, N. Y., A CORPORATION OF NEW YORK.

OSCILLATION GENERATOR FOR CURRENT OF CONTINUOUSLY VARYING FREQUENCY.

Application filed October 6, 1919. Serial No. 328,626.

This invention relates to oscillation generators for generating electrical currents or oscillations whose frequency varies cyclically and continuously over a selected range.

Among the objects of the invention are to provide oscillation generators of the described type having such a construction as to materially decrease the mechanical difficulties connected with their design and operation, to reduce the bulk, weight, and cost thereof, and to increase their durability and reliability in operation.

A particular object of the invention is to provide an oscillation generator for producing oscillatory current of a continuously and cyclically varying frequency over the range of audible frequencies and in greater particularity over that portion of the range of audible frequencies which is necessary for telephone apparatus to transmit efficiently in order to reproduce speech. Further objects of the invention will appear hereinafter in connection with the detailed description of the apparatus described.

The objects of the invention are accomplished by generating the desired form of wave by means of a thermionic vacuum tube repeater having circuit arrangements whereby it is enabled to function as an oscillator and by having the frequency-determining circuit of the oscillator provided with a motor or power-driven variable inductance. This variable inductance in one form consists of a coil having a magnetic circuit whose reluctance is caused to vary cyclically and continuously. Since the range of frequencies essential to the reproduction of speech may be roughly estimated as including those between 250 and 2500 cycles per second, provision must be made in case it is desired to cover this entire range that the oscillator will continue to generate while the inductance is varied over the required range. For many practical purposes, however, it may be sufficient if the frequency is varied over a smaller range. In this specification the range of from 500 to 1500 cycles per second will be arbitrarily chosen but the principles given will enable one skilled in the art to construct an apparatus for any range of frequencies desired.

It has hitherto been shown by H. D. Arnold and J. P. Minton in their joint application, Serial No. 201,565, filed November 17, 1917, Patent No. 1,426,807, granted Aug. 22, 1922, which also describes a testing system in which an oscillator of this type may be utilized, how to construct an oscillator in which the capacity of the frequency-controlling circuit of the thermionic generator comprises a condenser so arranged as to be motor driven and thereby to have a cyclically and continuously variable electrical capacity. However, there are certain difficulties connected with the construction of such a variable capacity which will be avoided by means herein described. Suppose in such an oscillator the fixed inductance of the oscillatory circuit in one henry, then for a minimum frequency of 500 cycles per second a capacity of approximately .1 microfarad would be needed. For a maximum frequency of 1500 cycles the capacity needed would be approximately 1/90 of a microfarad. In any case the ratio of the maximum capacity to the minimum capacity will be the square of the ratio of the maximum frequency to the minimum frequency. In order that one set of plates may be rotatable it is necessary to use an air or oil dielectric condenser. If an air condenser of 1/10 microfarad is provided it would consist of a large number of plates of large area and would occupy a considerable space, i. e., a space of the order of a cubic meter. In the case of an oil condenser, while it might be built to occupy somewhat less space, a great amount of mechanical power would be lost in rotating the movable plates owing to the resultant continuous stirring of the oil. The mechanical difficulties attached to the building and using of such a variable condenser having sufficient strength to stand the strain of continuously rotating one set of its plates at a velocity of from 50 to 500 revolutions per second, and the difficulty of combining therewith the necessary mechanism for rotating it, renders such a generator impracticable.

By the use of the herein described apparatus, the most difficult problems connected with generators having a continuously and cyclically varying frequency are avoided or much simplified. While this invention relates most especially to oscillators for generating a variable range of speech frequencies, it may be utilized for the production of any range of frequency which may be necessary for a particular purpose and is not limited except by the scope of the appended claims.

Figure 2:
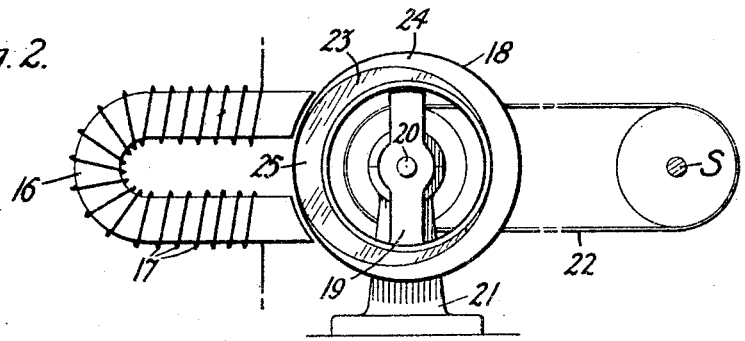
Figure 3:
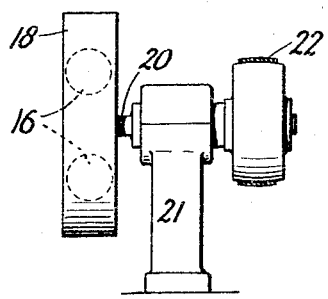

Of the accompanying drawings, Fig. 1 represents diagrammatically a system embodying the invention, while Figs. 2 and 3 relate to the mechanical details of the variable inductance.

Referring specifically to Fig. 1, the vacuum tube or space discharge device 1, having an impedance-controlling element 2 and anode 3 and a cathode 4, is connected by a lead 5 and a tuned circuit 6. The tuned circuit comprises the condenser C and the inductances $L_1$ and $L_2$. The anode 3 of the tube 1 is connected to the tuned circuit through the lead 9 having included therein the source of direct current 10 and the by-passing capacity 11. The inductance $L_2$ is conventionally represented by a coil 7 rotatable with respect to the fixed coil 8. A suitable current source $s$ may be placed in the lead 5 to suitably polarize the grid 2 with respect to the cathode. Connected across the terminals of the capacity C is the input circuit 13 of a thermionic repeater system 12 across which may be shunted the high impedance 14 in series with a suitable grid polarizing battery. The output circuit 15 conducts the amplified oscillations to any suitable load device to which they are to be applied for utilization.

The frequency at which the tube 1 will generate oscillations will be determined approximately by the electrical capacity and the effective inductance of the inductance coils $L_1$, 7, and 8. If $c$ represents the capacity of condenser C, $l_1$ the inductance of coil $L_1$ and $l_2$ the inductance at any instant of $L_2$, then the resulting frequency $f$ will be determined by the well-known formula $$f = \frac{1}{2\pi\sqrt{c(l_1+l_2)}}.$$

Among the requirements that the system will oscillate is that the input potential applied to the grid 2 by oscillations in the oscillation circuit is sufficient to cause the output circuit of the tube to supply enough energy to the tuned circuit to maintain the oscillations. In the case of a system having no losses and from which no energy is drawn, the ratio of the value of $l_1$ to $l_2$ must be at least equal to the reciprocal of the value of the amplifying constant $\mu$ of the tube, which constant may be defined as the ratio of the change of output current to applied input voltage. Owing, however, to the fact that certain losses occur and energy is to be drawn from the system, this ratio must be considerably larger. Assume that in the present instance the amplifying constant $\mu$ has a numerical value of 50, then the ratio of $l_1$ to $l_2$ would be approximately 1/25, which we may assume to be the minimum ratio at which oscillations may be generated. In any practical case this ratio may be determined either mathematically or experimentally. Assuming then that the frequency range from 500 to 1500 cycles per second is desired and assuming that the capacity C has a fixed value of .4 microfarad and that $L_1$ must always be at least 1/25 of $L_2$, we can, by applying the formula given above, prepare the following table of approximate values:

| $L_1$ | $L_2$ | $L_1+L_2$ | $f$ |
|---|---|---|---|
| .02 henry | .233 henry | .253 henry | 500 |
| .02 henry | .008 henry | .028 henry | 1,500 |

The inductance $L_2$ may be constructed in any suitable manner which will give the required range of values and may have any suitable driving means applied thereto to produce the required cyclical variation. One form of construction originally suggested was to provide a coil with a slidable magnetic core and to drive the core in and out of the coil at a suitable rate of speed. A more suitable form of inductance for this purpose is illustrated in Figs. 2 and 3 wherein numeral 16 represents a magnetic core having a winding 17. The metallic annular ring 18 having non-magnetic spokes 19 is mounted on a suitable shaft 20 so as to rotate before the poles of the core 16. The shaft 20 is supported by any suitable mounting 21 and is driven by any suitable connecting devices 22 from a power-driven shaft S. The ring 18 comprises a magnetic portion 23 and a non-magnetic portion 24. In rotating adjacent the core 16 the thickened portion 25 of the magnetic part of the ring 18 is presented alternately with the thin portion thereof to the faces of the core 16. This causes the magnetic reluctance of the circuit, of which the core 16 comprises a part, to vary cyclically in accordance with the rotation of the ring 18.

The above described form of variable inductance is similar in principle to that described in the United States Patent of Raymond R. Herrmann 1,459,319, June 12, 1923.

The novel features that are believed to be inherent in the invention are defined in the appended claims.

What is claimed is:

1. In combination, means for continuously producing a substantially pure sine wave, comprising a frequency-determining oscillation circuit including a variable inductor which has a rotatable core portion for varying its inductance, and means for continuously and cyclically varying the inductance of said inductor, and correspondingly the frequency, by uniformly and continuously rotating said core portion.

2. In combination, an oscillation generator comprising a highly evacuated containing vessel, an electron-emitting cathode, an anode, and an impedance-controlling element, coupled circuits related to said vessel, a condenser comprising with said coupled circuits a frequency-determining circuit for said generator, said frequency-determining circuit also comprising a variable inductor, and means for continuously and cyclically varying the oscillation frequency by continuously and cyclically varying the inductance of said inductor.

3. The method of generating a sinusoidal electrical wave whose frequency varies continuously and cyclically over a definite range by means of an electrical network including inductance, which comprises causing the inductance to assume, by a continuous and regular progression which is cyclically repeated, an infinite number of values within a given range and meanwhile producing under the control of said network, sinusoidal oscillations at the infinite number of natural frequencies assumed by the network.

4. The method of generating by means of an apparatus including an inductor constituting an element of a frequency determining circuit, a sinusoidal electrical wave having at different times all the frequencies within a given range, which comprises varying the inductance of said inductor continuously and cyclically over values corresponding sequentially to all the frequencies and thereby correspondingly varying the frequency.

In witness whereof, I hereunto subscribe my name this 8th day of September, A. D. 1919.

FREDERICK W. ISLES.